US009014432B2

(12) United States Patent
Fan et al.

(10) Patent No.: US 9,014,432 B2
(45) Date of Patent: Apr. 21, 2015

(54) LICENSE PLATE CHARACTER SEGMENTATION USING LIKELIHOOD MAXIMIZATION

(75) Inventors: Zhigang Fan, Webster, NY (US); Yonghui Zhao, Penfield, NY (US); Aaron Michael Burry, Ontario, NY (US); Vladimir Kozitsky, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 313 days.

(21) Appl. No.: 13/464,357

(22) Filed: May 4, 2012

(65) Prior Publication Data

US 2013/0294652 A1    Nov. 7, 2013

(51) Int. Cl.
*G06K 9/00*     (2006.01)
*G06K 9/32*     (2006.01)

(52) U.S. Cl.
CPC .......... *G06K 9/3258* (2013.01); *G06K 2209/15* (2013.01)

(58) Field of Classification Search
None
See application file for complete search history.

(56) References Cited

PUBLICATIONS

Sarkar, Prateek. "Image classification: Classifying distributions of visual features." Pattern Recognition, 2006. ICPR 2006. 18th International Conference on. vol. 2. IEEE, 2006.*
Jiao, Jianbin, Qixiang Ye, and Qingming Huang. "A configurable method for multi-style license plate recognition." Pattern Recognition 42.3 (2009): 358-369.*
Collins, Robert T., Yanxi Liu, and Marius Leordeanu. "Online selection of discriminative tracking features." Pattern Analysis and Machine Intelligence, IEEE Transactions on 27.10 (2005): 1631-1643.*
Shapiro, Vladimir, and Georgi Gluhchev. "Multinational license plate recognition system: segmentation and classification." Pattern Recognition, 2004. ICPR 2004. Proceedings of the 17th International Conference on. vol. 4. IEEE, 2004.*
Hegt, Hans A., Ron J. De La Haye, and Nadeem A. Khan. "A high performance license plate recognition system." International Conference on Systems, Man and Cybernetics (1998: San Diego, Calif). SMC'98 conference proceedings. vol. 5. 1998.*
Leishman, Scott. Shape-free statistical information in optical character recognition. Diss. University of Toronto, 2007.*
Wassermn, Larry, All of Nonparametric Statistics, Springer, 2007, ISBN 0-387-25145-6.
Anagnostopoulos, et al., License Plate Recognition From Still Images and Video Sequences: A Survey, IEEE Trans. on Intelligent Transportation Systems, vol. 9 (3), Sep. 2008, pp. 377-391.

\* cited by examiner

*Primary Examiner* — Stephen R Koziol
*Assistant Examiner* — Raphael Schwartz
(74) *Attorney, Agent, or Firm* — Fay Sharpe LLP

(57) ABSTRACT

A method determines a license plate layout configuration. The method includes generating at least one model representing a license plate layout configuration. The generating includes segmenting training images each defining a license plate to extract characters and logos from the training images. The segmenting includes calculating values corresponding to parameters of the license plate and features of the characters and logos. The segmenting includes estimating a likelihood function specified by the features using the values. The likelihood function measures deviations between an observed plate and the model. The method includes storing a layout structure and the distributions for each of the at least one model. The method includes receiving as input an observed image including a plate region. The method includes segmenting the plate region and determining a license plate layout configuration of the observed plate by comparing the segmented plate region to the at least one model.

20 Claims, 5 Drawing Sheets

LICENSE PLATE CHARACTER SEGMENTATION USING LIKELIHOOD MAXIMIZATION

BACKGROUND

The present disclosure relates to a method and apparatus for determining a license plate layout configuration. It is appreciated that the present exemplary embodiments are also amendable to other like applications.

An automatic license plate recognition (APLR) system is a vehicular surveillance system that captures images of moving or parked vehicles using a still or video camera. The system locates a license plate in the image, segments the characters in the plate, and uses optical character recognition (OCR) to determine the license plate number. The APLR system often functions as a core module for an intelligent transportation infrastructure system as its many uses can include monitoring traffic flow, enforcing traffic laws, and tracking criminal suspects.

Character segmentation is used to find the individual characters on the plate. Character segmentation presents multiple challenges to conventional APLR systems. One challenge is that jurisdictions may use different layouts, so the system must be able to recognize multiple layouts to be effective. Yet, at the same time, some jurisdictions use similar license plate protocols. For example, a number of states in the U.S. may group equal numbers of characters together between spaces and/or logos. A conventional system relies on a user for confirming that the license plate number correlates to the correct state.

Another challenge associated with character segmentation is the ability to distinguish characters from other objects that form part of the plate or obscure the plate. Screws, dirt, logos, graphics, plate borders, and plate frames can all affect the number of characters that the system detects on the plate. The objects can affect the boundaries drawn between segments and, thus, the ability for the system to distinguish the final output.

The effects of different imaging conditions also present a challenge to character segmentation. Overexposure, reflection, and shadows may result from low contrast, between the image and background, and poor or uneven lighting. There is a need for an ALPR system that is robust enough to handle different conditions.

There is a low tolerance for segmentation error made by an ALPR system because its many applications require high accuracy. Therefore, a need exists for an ALPR system that improves accuracy by reducing a risk of over- and under segmenting, determining erroneous results, and rejecting plate localization errors.

BRIEF DESCRIPTION

A first embodiment of the present disclosure is directed toward a method for determining a license plate layout configuration. The method includes generating at least one model representing a license plate layout configuration. The generating includes segmenting training images each defining a license plate to extract characters and logos from the training images. The segmenting further includes calculating values corresponding to parameters of the license plate and features of the characters and logos. The segmenting includes estimating a likelihood function specified by the features using the values. The likelihood function is adapted to measure deviations between an observed plate and the model. The method includes storing a layout structure and the distributions for each of the at least one model. The method further includes receiving as input an observed image including a plate region. The method includes segmenting the plate region and determining a license plate layout configuration of the observed plate by comparing the segmented plate region to the at least one model.

Another embodiment of the present disclosure is directed toward a system for determining a license plate layout configuration. The system includes a training device including a processor for generating at least one model representing a license plate layout configuration. The training device is adapted to segment training images of license plates to extract characters and logos from the training images. The training device further calculates values corresponding to parameters of the license plate and features of the characters and logos. The training is also adapted to estimate a likelihood function specified by the features using the values. The likelihood function is used to measure deviations between an observed plate and the model. The system further includes a storage device that is in communication with the training device. The storage device is adapted to store a layout structure and the distributions for each model. The system also includes a segmentation device that is in communication with the storage device. When an observed image including a plate region is received, the segmentation device is adapted to compare the plate region to the at least one model stored in the storage device. Based on the comparison, the segmentation device determines a license plate layout configuration of the observed image.

A further embodiment of the disclosure is directed toward a method for segmenting an observed image of a license plate for determining a layout configuration of the license plate. The method includes providing at least one model representing a license plate layout configuration. The method includes receiving as input an observed image including a plate region. The method includes producing binary maps of the plate region by applying at least two binary thresholds. Using the binary maps, the method determines object connected components relative to background connected components. The method matches the determined object connected components against the at least one model. The method further includes determining if the matching score for the at least one model is below a pre-set threshold. The method then determines if the at least one model is a closest match to the plate region in the observed image.

DETAILED DESCRIPTION

Figure 1A:
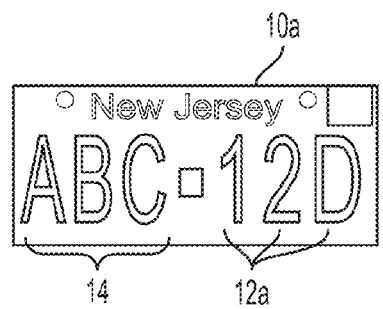
FIGS. 1A and 1B show examples of serial formats included on sample license plates.
Figure 1B:
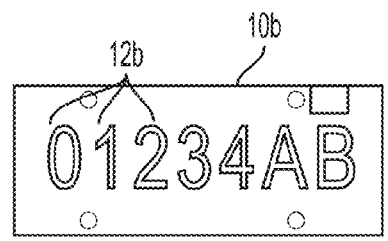
Figure 2A:
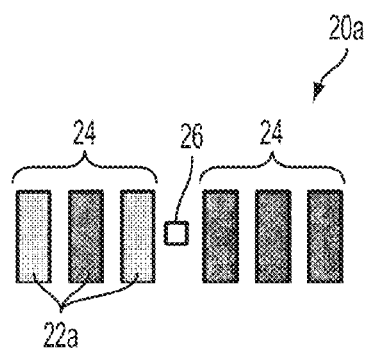
FIGS. 2A and 2B show segments representing characters of the plates in FIGS. 1A and 1B after the plates undergo a segmenting process.
Figure 2B:
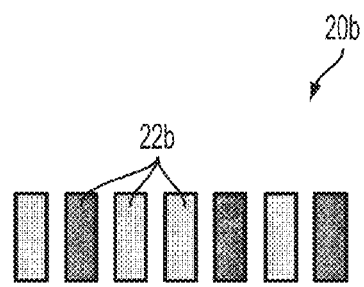

The present disclosure relates to a method and apparatus for determining a license plate layout configuration. The method is performed in two stages. In a first training stage, sample plates are used to generate likelihood functions describing multiple plate models. Each plate model is defined by a particular layout structure for a sample license plate. The layout structures among plate models can include different serial formats, which are usually alphanumeric, and can be described by the number of characters in a group, the number of character groups, the location of a space or a hyphen, and the space that can be occupied by a logo. Two exemplary formats are shown in FIG. 1. FIG. 1A shows a six-character format, such as 123456 and 123-456 that is used in less populous states. FIG. 1B shows a seven-character format, such as 1ABC234 and ABC-1234, which is used in several populous states. In the training stage, the characters of the sample plate models are segmented, as shown in FIGS. 2A and 2B, and the segments are measured using a (log) likelihood function. Deviations in the results are approximated as a sum of a set of the feature (log) likelihood functions.

In the second segmentation phase, a series of candidates for license plate formats are calculated from an original license plate that is captured in an image. Each candidate format is generated by varying thresholds that are applied to the image. Feature vectors are estimated from each candidate. Likelihoods are then calculated from the features and compared to the models that were described in the training phase. The final segmentation result, i.e., the license plate format, is determined as the model having the maximum likelihood.

Figure 3:
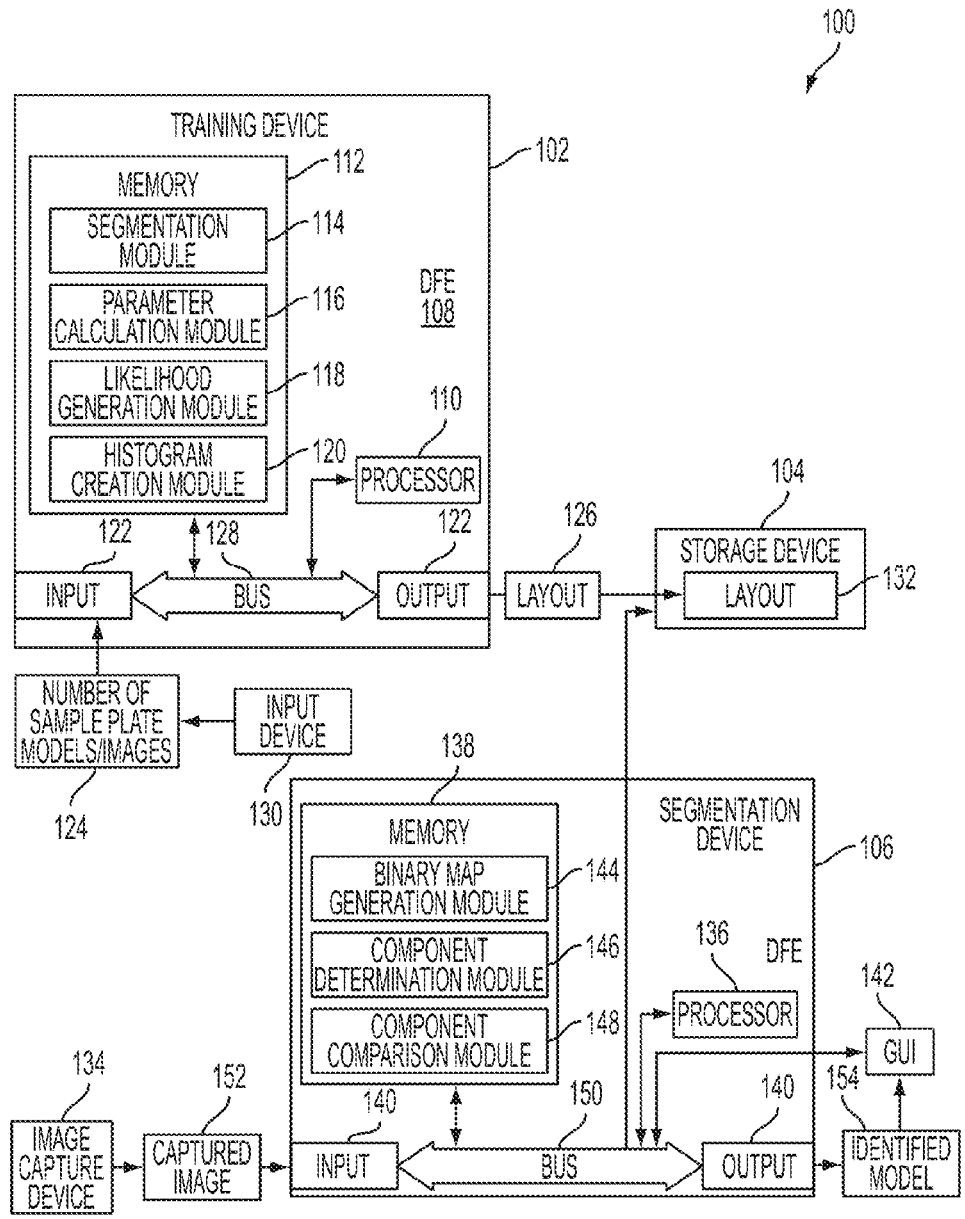
FIG. 3 is a schematic illustration of an ALPR segmentation system in one exemplary embodiment.

FIG. 3 is a schematic illustration of an ALPR segmentation system 100 in one exemplary embodiment. The ALPR segmentation system 100 includes a training device 102, a storage device 104, and a segmentation device 106, which may be linked together by communication links, referred to herein as a network. These components are described in greater detail below.

The training device 102 illustrated in FIG. 3 includes a controller 108 that is part of or associated with the training device 102. The exemplary controller 108 is adapted for controlling a training of the ALPR system 100 by generating at least one likelihood function that can be later compared to captured images. The controller 108 includes a processor 110, which controls the overall operation of the training device 102 by execution of processing instructions, which are stored in memory 112 connected to the processor 110.

The memory 112 may represent any type of tangible computer readable medium such as random access memory (RAM), read only memory (ROM), magnetic disk or tape, optical disk, flash memory, or holographic memory. In one embodiment, the memory 112 comprises a combination of random access memory and read only memory. The digital processor 110 can be variously embodied, such as by a single-core processor, a dual-core processor (or more generally by a multiple-core processor), a digital processor and cooperating math coprocessor, a digital controller, or the like. The digital processor, in addition to controlling the operation of the training device 102, executes instructions stored in memory 112 for performing the parts of the method outlined in FIG. 4 that are performed at the ALPR segmentation system 100. In some embodiments, the processor 110 and memory 112 may be combined in a single chip.

The training device 102 may be embodied in a networked device, although it is also contemplated that the training device 102 may be located elsewhere on a network to which the ALPR segmentation system 100 is connected, such as on a server, networked computer, or the like, or distributed throughout the network or otherwise accessible thereto. The training phase disclosed herein is performed by the processor 110 according to the instructions contained in the memory 112. In particular, the memory 112 stores a segmentation module 114, which segments training images (i.e., sample plate models) each defining a license plate layout to extract characters and logos from the training images; a parameter calculation module 116, which calculates values corresponding to parameters of the license plate and features of the characters and logos; a likelihood function generation module 118, which estimates a likelihood function specified by the features using the values; and, a histogram creation module 120, which builds a histogram for each feature. Embodiments are contemplated wherein these instructions can be stored in one module. The modules 114-120 will be later described with reference to the exemplary method.

The software modules as used herein, are intended to encompass any collection or set of instructions executable by the training device 102 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions.

With continued reference to FIG. 3, the training device 102 also includes one or more communication interfaces, such as network interfaces, for communicating with external devices. The communication interfaces 122 may include, for example, a modem, a router, a cable, and and/or Ethernet port, etc. The communication interface 122 is adapted to receive sample (hereinafter "training") images 124 as input and provide at least one likelihood function and layout configuration 126 as output. In contemplated embodiments, one communication interface can receive the input and provide the output. The various components of the training device 102 may be all connected by a bus 128.

The training device 102 may include one or more special purpose or general purpose computing devices, such as a server computer or digital front end (DFE), or any other computing device capable of executing instructions for performing the exemplary method.

FIG. 3 further illustrates the training device 102 connected to an input device 130 for inputting and/or receiving the training images in electronic format. The input device 130 may include an image capture device, such as a camera, that is selected to provide the sample images 124 of the plates that will later be segmented, or it can be a device adapted to transmit the sample images captured by a camera to the training device 102. For example, the input device 130 can include a scanner, a computer, or the like. In another embodiment, the image data 124 may be input from any suitable source, such as a workstation, a database, a memory storage device, such as a disk, or the like. The input device 130 is in communication with the controller 108 containing the processor 110 and memories 112.

With continued reference to FIG. 3, the ALPR segmentation system 100 includes a storage device 104 in communication with the training device 102. In a contemplated embodiment, the training device 102 can be in communication with a server (not shown) that includes a processing device and memory, such as storage device 104, or has access to a storage device 104, for likelihood functions and layout structures that can be used by the segmentation device 106. The storage device 104 includes a repository 132, which stores at least one likelihood function and plate layout 126 provided by the training device 102.

With continued reference to FIG. 3, the ALPR segmentation system 100 further includes the segmentation device 106 in communication with the storage device 104. The exemplary segmentation device 106 includes, for example, a computer or microcomputer. The segmentation device 106 may be included as part of an image capture device 134 or it may be in communication with the image capture device 134. The segmentation device 106 includes a processor 136, such as a CPU, and a memory 138 for storing software modules executable on the processor of the CPU and at least one communication interface 140 including hardware and/or software suitable for providing wireless data communication with the storage device 104, the image capture device 134, and a graphical user interface (GUI) 142. The memory 138, processor 136, and communication interface(s) 140 can be similarly configured to memory 112, processor 110, and communication interface 122 of the training device 102. The exemplary software module includes a binary map generation module (or, in one embodiment, a projection generation module) 144, which produces a binary map of the plate region by applying a threshold for binarization; a component determination module 146, which determines dark connected components relative to light connected components, and measures features of the determined black connected components; and, a component comparison module 148, which matches the determined black connected components against at least one model, determines if the matching score meets a threshold, and determines the model that is a closest match to the plate region in the observed image. These modules 144-148 will be later described with reference to the exemplary methods of FIGS. 4 and 6. The various components of the segmentation device 106 may be all connected by a bus 150.

With continued reference to FIG. 3, captured image data 152 may undergo processing by the segmentation device 106 and an identified model 154 may be displayed to the user in a suitable form on the GUI 142 in communication with the segmentation device 106. The GUI 142 can include a display, for displaying information, such as the segmented characters or the license number in the segmented image, to users, and a user input device, such as a keyboard or touch or writable screen, for receiving instructions as input, and/or a cursor control device, such as a mouse, trackball, or the like, for communicating user input information and command selections to the processor 136.

Figure 4:
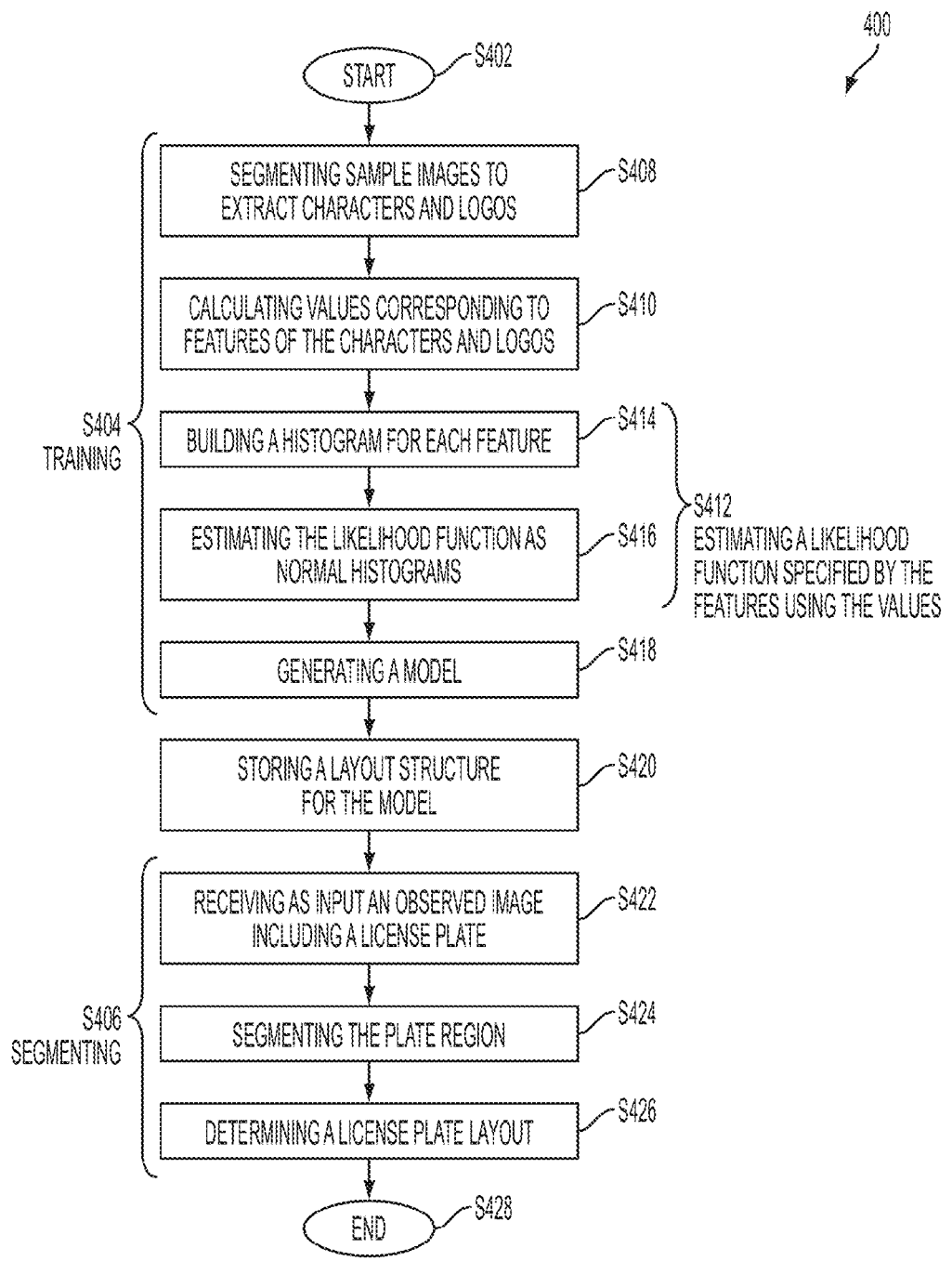
FIG. 4 is a flow-chart describing a method for determining a license plate layout configuration.

FIG. 4 is a flow-chart describing the method 400 for determining a license plate layout configuration. The method starts at S402. As mentioned, the method includes a training stage at S404, which is used to establish at least one license plate layout model. The training stage is performed by the training device 102 and may be performed offline. The method also includes a segmentation phase at S406, which is used to determine a license plate format from a captured image of a license plate using the at least one model provided at S404. The segmentation device 106 performs the segmentation stage.

Continuing with FIG. 4, the training S404 uses sample license plate images to generate models that define the different layouts describing the sample license plates. As used herein, the term 'layout' is synonymous with a 'format'. A format (or serial format) includes the alphanumeric characters that can be grouped in variable clusters that precede and follow a space and hyphens. In establishing the layout models at S404, information carried on the plates for specifying state and issuance information, such as, for example, slogans, landscapes, backgrounds, and characters around the periphery of the plate, are ignored.

The characters that represent the unique license plate number are used to define the layouts in the model plates. These characters are typically created with predetermined layout structures. As mentioned, the character formats may vary between states, counties, or countries of issuance. Multiple configurations of layouts may be used within a state, for example, for representing the different counties of issuance. However, the total number of possible configurations is still limited. Most plates can be represented using about 20 different models with reasonable accuracy.

Referring again to FIGS. 1A and 1B, the characters 10 in a license plate 10 are often clustered into groups 14. The characters within each group (12a and 12b) have the same pitch, which means that they are equally spaced. This pitch can vary between license plates based on the different government bodies that issue the plates. The dimensions and relative positions of the characters are used to specify the layout of characters in the models. FIG. 2A shows the license plate layout of characters in which a plate model 20a, representing the plate in FIG. 1A, contains six character segments 22a that are divided into two three-character groups 24. The plate model 20b also contains a small logo 26 that is placed between the groups. Similarly, the plate model shown in FIG. 2B includes seven character segments 22b that represent the seven characters included in the plate of FIG. 1B.

Continuing with FIG. 4, a number of training images (hereinafter synonymously referred to herein as "sample images 124") are provided to the training device 102. The segmentation module 114 segments the sample images to extract the characters and the logos at S408. The segments, as shown in FIGS. 2A and 2B, are bounding boxes that represent the different characters. The parameter calculation module 116 then uses the bounding boxes to calculate features from the extracted characters and logos at S410. The set of features include the dimensions and positions of objects, such as the characters and logos, and are represented by values.

In particular, the set of features that can be applied to the sample plates consist of a width and height of the character segments, a distance between character segments, the difference between left and right margins, heights and widths of a logo, a position of a logo, and a combination of the above. More specifically, the width and height of the characters are measured as the height and width of the bounding boxes. The distance between the characters is measured as the pitch or spacing between character segments. The distance is evaluated for each neighboring pair of bounding boxes within the same group. In one embodiment, the distance can be calculated from the centers of neighboring bounding boxes because the characters segments can have different widths based on the characters that are represented. For example, the numeral "1" and the letter "I" include widths that are generally narrower than other alphanumeric characters, such as, for example, the numeral "2" and the letter "H". A margin is measured as a distance between a center of a first character of a plate to the vertical edge situated along the same side of the plate. This measurement includes one-half of the character width that is taken from the center. Therefore, for example, the left (right) margin measurement is the distance between the centers of the first (last) character of the plate to the left (right) edge. Again, the centers of the bounding boxes are used to account for the varying widths of different characters. The position of a logo is measured relative to a nearest neighboring character segment. The measurements that are used to describe the extracted characters are recorded.

With continued reference to FIG. 4, the features can be used to specify a likelihood function at S412. More specifically, the values that were obtained for the measurements at S410 are used to estimate the likelihood function at S412.

The likelihood function can be generated by the likelihood generation module 118 to measure deviations in observed plates. The license plate that is later observed in a captured image during the segmentation stage at S406 can deviate from models because of various noise and artifacts.

The likelihood function is specified by a set of features describing the sample license plates. As the features are largely independent of each other, the (log) likelihood function can be approximated as a sum of a marginal (log) likelihood using the equation $$\log p(x|s,m) = \Sigma_i \log f_i(x|s,m) \quad (1)$$

Where p(x|s, m) is the likelihood given the segmentation s under model m and observation x; and, $f_i(x|s, m)$ is the marginal distributions for feature i under model m.

The equation for the likelihood thus becomes:

$$\log p(x|s,m) = \Sigma_i \log f_w(w_i|m) + \Sigma_i \log f_h(h_i|m) + \Sigma_i \log f_d(d_i|m) + \Sigma_i \log f_\Delta(\Delta|m) + \Sigma_i \log f_{Wi}(W_i|m) + \Sigma_i \log f_{Hi}(H_i|m) + \Sigma_i \log f_{Xi}(X_i|m) + \Sigma_i \log f_{Yi}(Y_i|m) \quad (2)$$

Where $f_w(w|m)$ is a distribution for character width under model m;

$f_h(h|m)$ is a distribution for character height under model m;

$f_d(d|m)$ is a distribution of character distances under model m;

$f_{Wi}(W|m)$ is a distribution of the i-th logo's width;

$f_{Hi}(H|m)$ is a distribution of the i-th logo's height;

$f_{Xi}(X|m)$ is a distribution of the logo's horizontal position;

$f_{Yi}(Y|m)$ is a distribution of logo's vertical position; and, $f_\Delta(\Delta|m)$ is a distribution of the margin difference.

Figure 5:
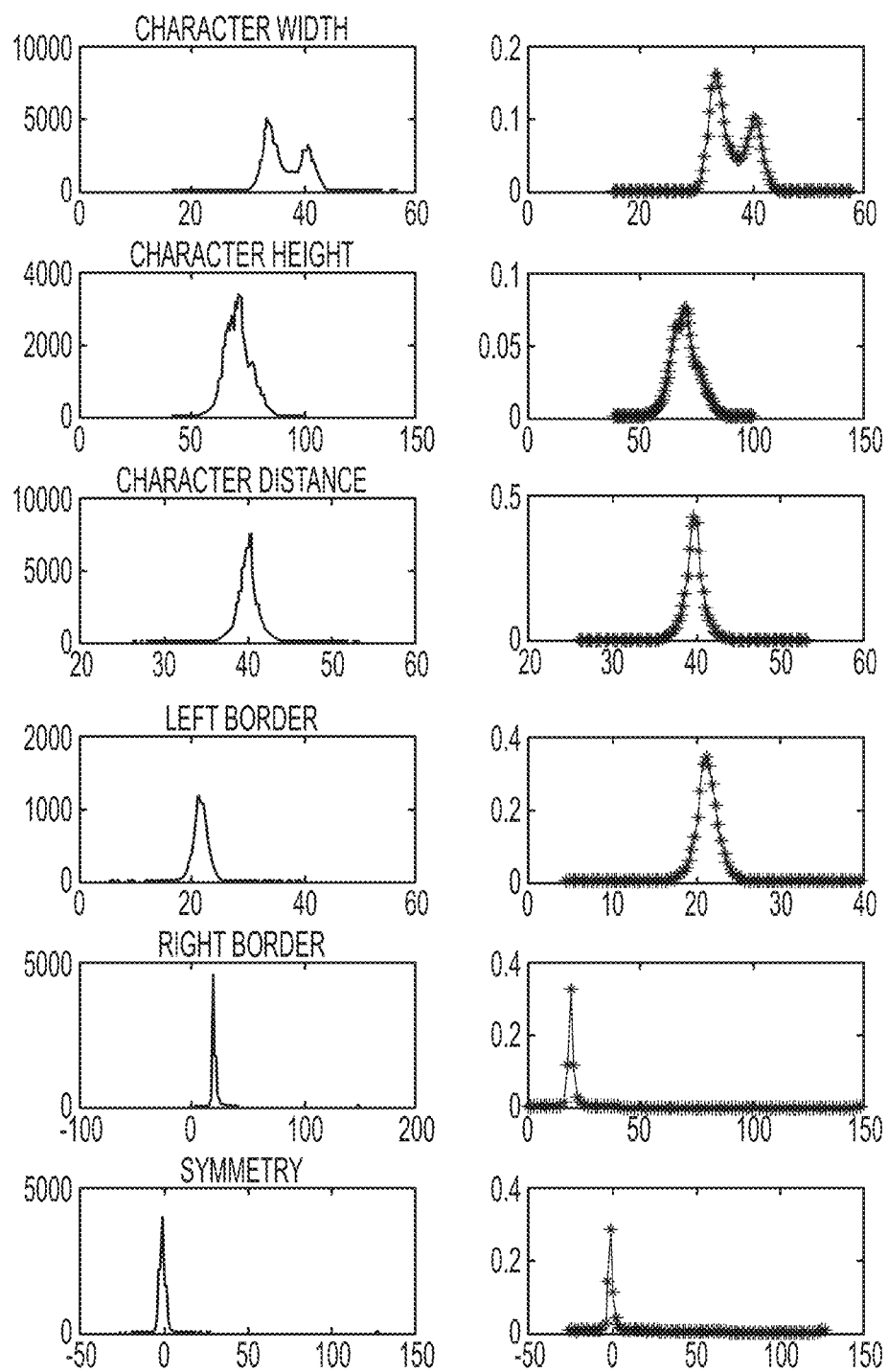
FIG. 5 shows examples of feature distributions.

Continuing with FIG. 4, a histogram is built for each feature at S414 using the histogram creation module 120. Each histogram is used to estimate a probability distribution of a feature from the measurements. However, many conventional technologies can be used to estimate the probability distributions; there is no limitation made herein to using histograms for estimating the probability distributions. FIG. 5 shows several examples of feature distributions that were obtained for a sample license plate design from the state of California.

As shown in FIG. 5, the features of character width, character height, character distance, the left margin, the right margin, and, in the example, symmetry, are modeled as non-parametric functions. For example, the histogram provides an order of probability that the character represented by the segment takes on a certain feature, such as, for example, height, for most license plates. The distribution is estimated as the normalized histogram at S416 (FIG. 4). The training is near complete when each feature takes a certain value.

With continued reference to FIG. 4, a model is generated for each license plate layout configuration at S418. A model includes the serial format or layout structure, the dimensions of the characters and logos, and the relative positions of the characters and logos. To achieve scale invariance, the dimension and position values can be normalized to the character pitch. The models can be generated from the measurements taken and estimates produced from the sample license plates. The models can also be generated from the license plate design specifications. One model can be used to represent multiple license plate designs having similar character formats that vary slightly in the parameters.

With continued reference to FIG. 4, the layout structure and the feature distributions are stored in a database 142 at S420 for each model. The models are used in the segmentation at S406. The segmenting at S406 includes receiving as input an observed image that includes a license plate at S422. Generally, the image is provided by an image capture device 152 that is included in the APLR segmentation system 100. The image may include a bumper region where the license plate is mounted. In this instance, the license plate region in the image is determined, and the license plate portion of the image is used for the purposes of the segmenting. More specifically, the plate region is located from the input image using a plate localization module of ALPR. The captured license plate is segmented at S424 to determine the different characters that make up the layout. The characters are compared to the models that were generated at S418 to determine the layout or format of the license plate in the captured image at S426. The method ends at S428.

Figure 6:
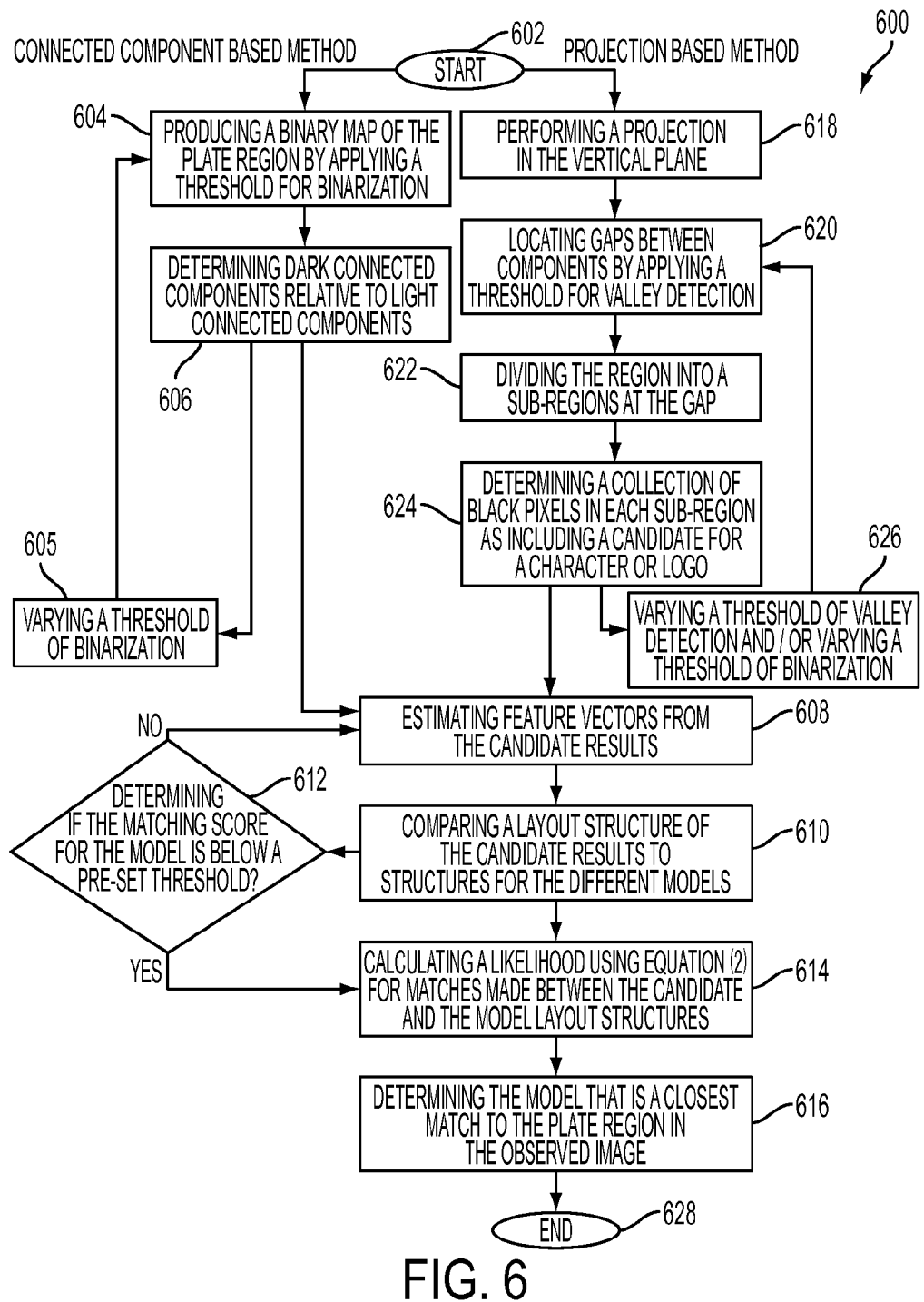
FIG. 6 is a flow chart for determining a license plate format using a process of segmenting.

FIG. 6 is a flow chart describing the segmenting at S424 in FIG. 4. The process 600 includes generating multiple candidates for segmentation results. In other words, an actual image of the license plate is segmented using varying thresholds to extract the characters and logos in different candidate formats. A candidate format or a candidate, as referred to herein, is a possible layout model that can represent the license plate that was captured in the image. Accordingly, multiple candidate formats can be generated for one image. Each candidate format is compared to the stored models. The license plate layout is the model that is the closest match to the candidate format.

With continued reference to FIG. 6, the method starts at S602. In a first method (referred to in FIG. 6 as a "connected component based method"), a first candidate format is generated by producing a binary map of the plate region at S604. The binary map generation module 144 applies a first predetermined threshold to produce the binary map of the license plate region. Because a license plate generally includes objects that contrast a background, the map produces a collection of dark components relative to light components. The system is programmed to determine that dark components represent the objects and light components represent the background. In a further embodiment, the system can determine that light components represent the objects and dark components represent the background for government bodies that issue the reverse, i.e., plates having light lettering against a dark background. For ease of description, dark components are considered candidates for characters and logos herein.

The dark connected components are determined at S606 relative to light connected components. A dark connected component includes a group of black pixels. In other words, a number of black pixels that are all connected toogether collectively form a dark connected component. The features of each dark connected component group are determined at S608. More specifically, height and width features are measured for each dark connected component. The dark connected component represents a segment, which is matched against the layout structures of the different models at S610. More specifically, the measurements for the features are compared to the dimensions and relative positions of the characters and logos that are stored for each model at S420(FIG. 4). The models that correspond to the closest matches are considered for the candidate format. In one embodiment, a model can be considered if it meets a predetermined threshold at S612. The character format for models that do not meet the threshold can be removed from consideration.

Continuing with the connected component based method of FIG. 6, additional models can be considered by varying a threshold of binarization tb at S605. In this manner, at least a second binary map can be used to produce a different candidate format, which can be compared to the models for determining a closest match. By varying the threshold of binarization, a different set of dark connected components can result from the received input image. For each threshold of binarization that is provided for generating a candidate format at S614, the process returns to S604.

With continued reference to FIG. 6, a likelihood is calculated at S614 using equation (2) above for the matches that are made between the layout structures of the models and the candidates. The model that is the closest match to the plate region in the observed image is determined at S616. More specifically, the layout structure for a model having a maximum likelihood is output at the GUI (142 in FIG. 3) as being the best result. The format of the license plate in the captured image is determined as being the same as the serial format or layout structure that corresponds to the closest model. As mentioned, this format was stored at s420 with the model.

In another embodiment (referred to in FIG. 6 as a "projection based method"), a projection is performed at S618 on the binary map of the plate region in the vertical direction or plane. Gaps between the different dark connected components are located at S620. These gaps are referred to as valleys in the projections, which represent character and logo objects. The valley is based on a threshold value tv (referred to herein as a "threshold for valley detection") that is applied to the candidate format. In other words, the gaps and the objects can vary based on the threshold for valley detection.

Continuing with FIG. 6, the gaps are divided into sub-regions at S622. A collection of black pixels for each sub-region are determined at S624. Each collection of black pixels is representative of a candidate for a character or a logo. In one embodiment, the threshold for valley detection can be varied at S626 to generate at least a second, different collection of black pixels.

Once the candidate characters are generated, the process is performed by the component comparison module 148 and is analogous to the process described above for the connected component based method. In summary, the feature vectors are estimated at S608. The layout structure of the candidate results are compared to the structures for the different models at 610. A likelihood is calculated for any determined matches at S614. And, the layout format of the captured image is the layout for the model having the maximum likelihood at S616. In one embodiment having multiple close matches each with high results for the likelihood computation, the results for the close matches can be saved and/or passed onto the optical character recognition ("OCR"). The OCR can analyze the individual character(s) and determine a code confidence level that can be used by the system to facilitate a decision for the closest match.

As mentioned, multiple candidate character formats can be obtained using the component determination module 146 by varying either the threshold for binarization tb or the threshold for valley detection tv. The aspect of varying thresholds enables the system to reduce the amount of errors that might result from artifacts. More specifically, the varied thresholds enable the system to determine the best layout during the matching at S616. Because noise and other artifacts can be segmented in the process for consideration as object candidates under certain thresholds, the varied thresholds enable the system to generate different groups of dark connected components. The threshold that provides the closest layout structure, i.e., for the model that is associated with the highest likelihood at S614, will not generate dark connected components that misrepresent the artifacts as characters. Accordingly, the process of determining the dark connected components at S604-S606, S614 and/or the collection of black pixels at S620-S626 can be repeated until obtaining the best result when running all the components and collections against the models at S608-S616.

In a similar manner, other relevant parameters that drive a particular segmentation algorithm can be varied to increase the likelihood that candidate characters that are generated for the comparison with the models will produce the closest possible match. The method ends at S628.

Although the methods 400 and 600 are illustrated and described above in the form of a series of acts or events, it will be appreciated that the various methods or processes of the present disclosure are not limited by the illustrated ordering of such acts or events. In this regard, except as specifically provided herein, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

One aspect of the system is that it reduces the risk of generating poor and erroneous segmentation results. In conventional systems, the OCR may still generate poor and erroneous results when the confidence is high. Because these conventional systems rely on the OCR confidence as a sole deciding factor for determining whether a segmentation result is valid, the conventional system may output the wrong layout. For example, in a conventional system, the OCR might split the character letter "U" into the two characters "L" (or "1") and "J". The OCR in the conventional system might output a lower confidence for the "L" and a higher confidence for the letter "J". The resulting overall OCR confidence will not be unusual given the severity and distribution of imaging conditions that are typically observed in the field. However, the present disclosure rather accounts for character pitch and centering information when computing the results for a character, thus improving the overall accuracy of the results. The apparatus and method of the disclosure rejects segmentation results that do not fit the models. For example, it rejects segmentation results that erroneously include non-character artifacts, which reduce likelihood. The system further avoids making changes to the features by over- and under-segmenting the characters. Over- and under-segmentation can reduce the likelihood when features, such as character dimension and position, are significantly changed.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for determining a license plate layout configuration, the method comprising:
generating at least one model representing a license plate layout configuration, the generating including:

for training images each including a sample license plate, segmenting each character and logo from the at least one sample license plate into a bounding box representation, calculating values corresponding with each bounding box representation of the at least one sample license plate, and estimating a likelihood function for defining a distribution of the values storing a license plate layout configuration and the distribution of values for each of the at least one model;

classifying an observed license plate in a captured image, the classifying including:

segmenting the observed license plate into segments using varying thresholds to extract segments, wherein each threshold applied to the observed license plate produces the segments making up a possible layout model;

estimating features for the segments extracted for each possible layout model;

identifying candidate models by comparing measurements for the features against the distributions stored for the models;

calculating a likelihood for each determined match between a layout structure of the each candidate model and the stored models, wherein the likelihood is calculated as a sum of a marginal (log) likelihood using the equation:

$$\log p(x|s,m) = \Sigma_i \log f_i(x|s,m),$$

where p(x|s, m) is the likelihood given the segmentation s under model m and observation x and $f_i$(x|s, m) is marginal distributions for feature i under model m;

determining the model having the maximum likelihood; and associating the observed license plate as having the license plate layout configuration associated with the model having the maximum likelihood.

2. The method according to claim 1, wherein the estimating the likelihood function includes:

building a histogram for each feature; and, estimating the likelihood function as normalized histograms.

3. The method according to claim 1, wherein the segmenting the plate region includes:

(a) producing a binary map of the plate region by applying a threshold for binarization;

(b) determining object connected components relative to background components, wherein the object components include candidates for a character or a logo;

(c) matching the determined black connected components against the at least one model;

(d) determining if the matching score for the model is below a pre-set threshold; and (e) determining the model that is a closest match to the plate region in the observed image.

4. The method according to claim 3, wherein the segmenting the plate region further includes:

measuring height and width features of each determined black connected component.

5. The method according to claim 3, wherein the segmenting the plate region further includes:

varying the threshold for binarization and repeating (b) through (e).

6. The method according to claim 1, wherein the segmenting the plate region includes:

(a) producing a binary map of the plate region;

(b) determining object components relative to background components;

(c) performing a projection in a vertical region;

(d) locating gaps between components by applying a threshold for valley detection;

(e) dividing the region into a sub-region at the gap;

(f) determining a collection of black pixels in each sub-region as including a candidate for a character or logo;

(g) matching the collections of black pixels against the at least one model;

(h) determining if a matching score for the model is below a pre-set threshold; and (i) determining a model that is a closest match to the plate region in the observed image.

7. The method according to claim 6, wherein the segmenting the plate region further includes:

varying the threshold of valley detecting and repeating (d)-(i).

8. The method according to claim 1, wherein the calculating the values includes character dimensions, character positions, logo dimensions, and logo positions.

9. The method according to claim 1, wherein the one of the dimension and the relative position is selected from the group consisting of:

character width;

character height;

distance between centers of characters in a group of characters;

a difference between left and right margins of the license plate;

logo height;

logo width;

logo positions relative to neighboring characters; and, a combination of the above.

10. The method according to claim 9, wherein the left margin is calculated as a distance between center of the first character of the plate to the left edge and the right margin is calculated as a distance between the center of the last character of the plate and the right edge.

11. A system for determining a license plate layout configuration, the system comprising:

a training device including a processor for generating at least one model representing a license plate layout configuration, the training device being adapted to:

for training images of sample license plates, segment each character and logo from at least one sample license plate into a bounding box representation, calculate values corresponding to with each bounding box representation of the at least one sample license plate, and, estimate a likelihood function for defining a distribution of the values;

a storage device in communication with the training device, the storage device being adapted to store a license plate layout configuration and the distribution for each model;

a segmentation device in communication with the storage device, wherein upon receipt of an observed image including a plate region, the segmentation device is adapted to:

segment the plate region into segments using varying thresholds to extract the segments, wherein each threshold applied to the plate region produces the segments making up a possible layout model;

estimate features for the segments extracted for each possible layout model;

identify candidate models by comparing measurements for the features against the distributions stored for the models;

calculate a likelihood for each determined match between a layout structure of the each candidate model and the stored models, wherein the likelihood is calculated as a sum of a marginal (log) likelihood using the equation:

$$\log p(x|s,m) = \Sigma_i \log f_i(x|s,m),$$

where p (x|s, m) is the likelihood given the segmentation s under model m and observation x and $f_i$ (x|s, m) is marginal distributions for feature i under model m;

determine the model having the maximum likelihood; and associate the license plate layout configuration as belonging to that of the model having the maximum likelihood.

12. The system according to claim 11, wherein the training device estimates the likelihood function as normalized histograms built for each of the features.

13. The system according to claim 11, wherein the segmentation device is adapted to:

produce a binary map of the plate region;

use the binary map to determine object connected components relative to background components;

match the determined black connected components against the at least one model;

determine if a matching score for the at least one model is below a pre-set threshold; and, determine the at least one model that is a closest match to the plate region in the observed image.

14. The system according to claim 13, wherein the segmentation device is adapted to produce and use at least a second binary map by varying a threshold for binarization.

15. The system according to claim 13, wherein the segmentation device is further adapted to:

measure height and width features of each determined black connected component.

16. The system according to claim 13, wherein after producing the binary map, the segmentation device is further adapted to:

perform a projection in the vertical region;

locate gaps between components by applying a threshold for valley detection;

divide the region into a sub-region at the gap; and, determine a collection of black pixels in each sub-region as including a candidate for a character or logo.

17. The system according to claim 16, wherein the gaps can be located by varying the threshold of valley.

18. A method for segmenting an observed image of a license plate for determining a layout configuration of the license plate, the method including:

providing at least one model representing a license plate layout configuration;

receiving as input an observed image including a plate region;

producing binary maps of the plate region by applying at least two binary thresholds;

using the binary maps to determine object connected components relative to background connected components;

matching the determined black connected components against the at least one model to identify at least one candidate model, the matching including;

estimating features for each, and identifying the at least one candidate model by comparing measurements for the features against distributions stored for the at least one model;

in response to a matching score for the at least one candidate model below a pre-set threshold, calculating a likelihood for each determined match between a layout structure of the at least one candidate model and the at least one model, wherein the likelihood is calculated as a sum of a marginal (log) likelihood using the equation:

$$\log p(x|s,m) = \Sigma_i \log f_i(x|s,m),$$

where p (x|s, m) is the likelihood given the segmentation s under model m and observation x and $f_i(x|s, m)$ is marginal distributions for feature i under model m;

determining the at least one model having the maximum likelihood; and associating the license plate layout configuration as belonging to that of the at least one model having the maximum likelihood.

19. A computer program product comprising non-transitory computer-readable recording media which encodes instructions for performing the method of claim 18.

20. A system for determining a license plate configuration, the system comprising:

a segmentation device comprising memory which stores instructions for performing the method of claim 18 and a processor, in communication with the memory for executing the instructions.

* * * * *